United States Patent

[11] 3,618,576

| [72] | Inventor | Paul F. Dixon |
| | | 1601 Chattanooga Ave., Youngstown, Ohio 44514 |
| [21] | Appl. No. | 38,103 |
| [22] | Filed | May 18, 1970 |
| [45] | Patented | Nov. 9, 1971 |

[54] RECIRCULATING EXHAUST GAS SYSTEM FOR INTERNAL COMBUSTION ENGINES
5 Claims, 1 Drawing Fig.

[52] U.S. Cl. .................................................. 123/119 A, 60/29, 60/39.46, 60/39.52
[51] Int. Cl. ..................................................F02m 25/06
[50] Field of Search........................................ 123/119 A; 60/39.52, 39.46, 29, 30

[56] References Cited

UNITED STATES PATENTS

| 2,017,481 | 10/1935 | Von Opel...................... | 123/119 A |
| 2,541,532 | 2/1951 | Mosser.......................... | 60/39.52 X |
| 3,035,561 | 5/1962 | Siegler.......................... | 123/119 A |
| 3,298,176 | 1/1967 | Forsyth et al.................. | 60/39.46 X |

*Primary Examiner*—Wendell E. Burns
*Attorney*—Webster B. Harpman

ABSTRACT: A recirculating exhaust gas system for internal combustion engines includes a filter for solids, a condenser and cooler, a compressor and a secondary condenser and a liquid container, all in a closed circuit connecting the exhaust outlet of an internal combustion engine with the air and fuel inlet thereof. Solids and water are removed from the exhaust gas and the remaining gaseous products are condensed to a liquid and recycled to the engine along with new fuel and air supplies.

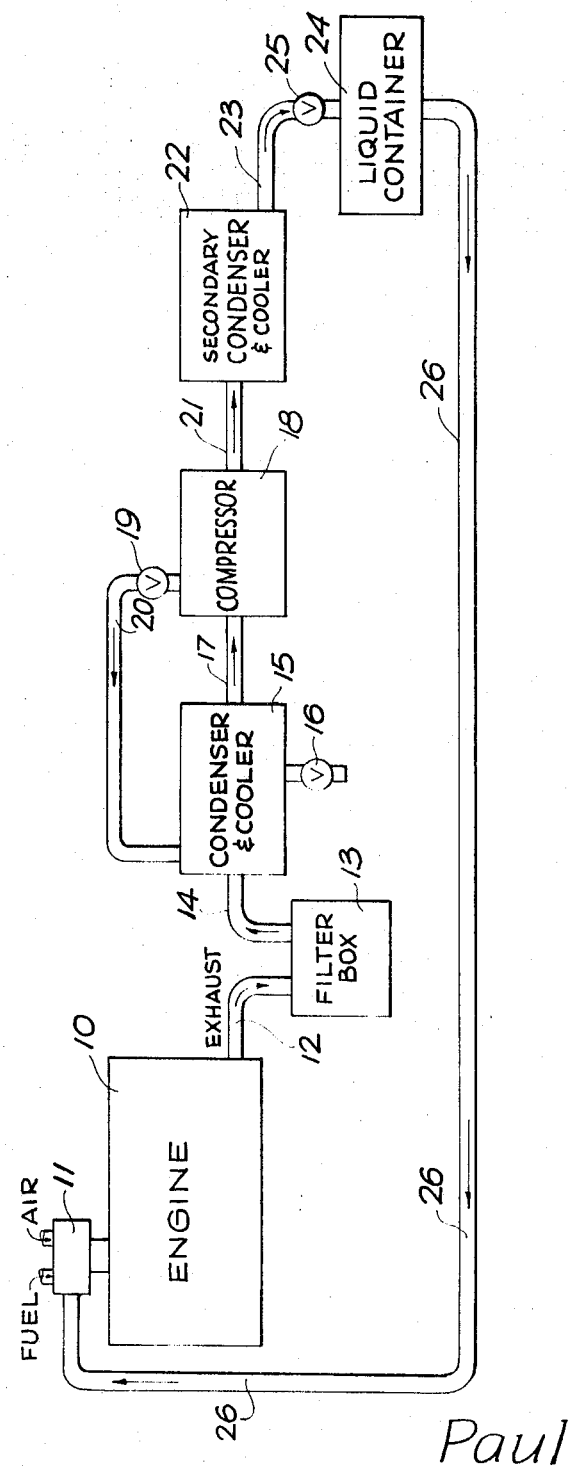

3,618,576

RECIRCULATING EXHAUST GAS SYSTEM FOR INTERNAL COMBUSTION ENGINES

BACKGROUND OF THE INVENTION

1. Field of the Invention

This invention relates to an exhaust gas elimination system wherein all of the gaseous products of combustion are recycled to the internal combustion engine for more complete combustion.

2. Description of the Prior Art

Prior exhaust gas elimination systems have proposed the introduction of oxygen such as in U.S. Pat. No. 2,017,481 another proposal cycles the exhaust gas from a first engine to a second engine with the addition of oxygen as in U.S. Pat. No. 2,478,682, the exhaust from the second engine being released to the atmosphere. A recirculating system incorporating a centrifugal separator is found in U.S. Pat. No. 2,147,670 and a partial recirculating system including means for cooling the exhaust gas is found in U.S. Pat. No. 2,419,747.

This invention eliminates the introduction of exhaust gases into the atmosphere and recycles the exhaust product of the engine completely so that the engine utilizes its fuel and air to produce only heat and power.

SUMMARY OF THE INVENTION

An exhaust gas elimination system for internal combustion engines comprises a substantially closed recirculating system for the exhaust gas communicating with the exhaust manifold and the fuel and air intake structure of the engine and passing the exhaust gas through a filter where solids are removed, an evaporator wherein water vapor is removed, a compressor wherein the remaining exhaust gas is largely liquified, a secondary cooler for the largely liquified exhaust gas and vapor remaining resulting in a liquid product and a liquid container for receiving the same from which the liquid is returned to the fuel and air intake structure of the engine. The solid waste materials are retained in the filter and can be periodically removed and the water vapor condensed to water can be retained in a suitable storage tank or dropped from the system as desired.

DESCRIPTION OF THE DRAWING

The FIGURE in the drawing comprises a block diagram symbolically illustrating the exhaust gas elimination system for internal combustion engines and shows the same in a recirculating system including an engine.

DESCRIPTION OF THE PREFERRED EMBODIMENT

In the form chosen for illustration and description an internal combustion engine 10 provided with an air and fuel intake structure 11 is illustrated with its exhaust manifold communicating with a pipe 12 which leads to filter 13. The filter 13 comprises an enclosure having filtering elements of heat impervious material such as steel wool or aluminum silicate fibers arranged to separate solid material from exhaust gas passing therethrough. The filter 13 may include a compartment for collecting the solids removed by the filter and provided with access means thereto as will be understood by those skilled in the art.

The exhaust gas leaves the filter 13 by a pipe 14 which communicates with a condenser and cooler 15 wherein the hot exhaust gas gives up its water vapor in the form of liquid which is removed from the condenser and cooler 15 by a valved outlet 16. The condenser and cooler 15 takes the form of a heat exchanger and may be actuated by air moved therethrough or by a refrigeration system as known in the art. The dried exhaust leaves the condenser and cooler 15 by a pipe 17 which communicates with a compressor 18 which may be of the piston type and wherein the exhaust gas is compressed to form a largely liquid product.

A relief valve 19 in an excess gas return pipe 20 communicates with the inlet of the compressor 18 and the inlet of the condenser and cooler 15 so that unusually high gas pressure at the inlet side of the compressor 18 may be vented to the inlet side of the condenser and cooler 15 and thereby relieved.

The largely liquid product delivered by the compressor 18 flows through a pipe 21 to a secondary cooler and condenser 22 which acts to cool the heated largely liquid product delivered by the compressor 18 and condense any vapors entrained therein to deliver a fully liquid product which is conveyed by a pipe 23 to a liquid container 24 by way of a check valve 25.

The liquified exhaust product is then piped from the liquid container 24 by means of a pipe 26 to the air and fuel intake structure 11 on the internal combustion engine 10. If the internal combustion engine 10 utilizes a carburetor, the return line communicates with the carburetor in the same manner as the fuel line. If the engine 10 is a diesel engine, the liquid exhaust product being recycled may be introduced along with the liquid fuel or preferably introduced into the air intake as by way of an expansion valve.

It will be thus be seen that the products of combustion which comprise the exhaust gas produced by the internal combustion engine 10 are passed through the recirculating system with the solids such as unburned carbon being separated by the filter 13 and retained therein for subsequent removal, water vapor content being separated by the condenser and cooler 15 and removed therefrom by way of the valved outlet 16 and the remaining gaseous exhaust product converted to a largely liquid product by the compressor 18 with the remaining gas being liquified by the secondary condenser and cooler 22 before delivery into the liquid container 24.

It will be obvious to those skilled in the art that the exhaust gas elimination system disclosed herein does not release any exhaust gases into the atmosphere and that essentially it converts the air and fuel supplied the internal combustion engine so equipped into heat and energy with only the filtered out solids and the water content being removed in the recycling process.

Although but one embodiment of the present invention has been illustrated and described it will be apparent to those skilled in the art that various changed and modifications may be made therein without departing from the spirit of the invention.

I claim:

1. A recirculating exhaust gas system for an internal combustion engine having an air and fuel inlet and an exhaust outlet, said system incorporating a solids separating filter, a water vapor condenser and gas cooler, a compressor, a secondary condenser and cooler and a liquid container, said system extending between said exhaust outlet and said air and fuel inlet.

2. The recirculating exhaust gas system of claim 1 and wherein the filter communicates with said exhaust outlet of said engine and with said condenser and gas cooler and wherein said condenser and gas cooler communicates with said compressor and said compressor communicates with said secondary condenser and cooler and said secondary condenser and cooler communicates with said liquid container, and said liquid container communicates with said air and fuel inlet of said engine.

3. The recirculating exhaust gas system of claim 1 and wherein an excess gas return line communicates with the intake side of said compressor and the intake side of said condenser and gas cooler and a relief valve is positioned in said excess gas return line.

4. The recirculating exhaust gas system of claim 1 and wherein said solids separating filter incorporates heat impervious filter elements and a solids collection area.

5. The recirculating exhaust gas system of claim 1 and wherein a valved water outlet is provided in said water vapor condenser and gas cooler.

* * * * *